(12) United States Patent
Broach

(10) Patent No.: US 11,018,453 B1
(45) Date of Patent: May 25, 2021

(54) CORD RESTRAINT FOR ELECTRICAL CORDS

(71) Applicant: Roger Cheston Broach, Tulsa, OK (US)

(72) Inventor: Roger Cheston Broach, Tulsa, OK (US)

( * ) Notice: Subject to any disclaimer, the term of this patent is extended or adjusted under 35 U.S.C. 154(b) by 0 days.

(21) Appl. No.: 15/812,918

(22) Filed: Nov. 14, 2017

Related U.S. Application Data

(60) Provisional application No. 62/421,421, filed on Nov. 14, 2016.

(51) Int. Cl.
*H01R 13/639* (2006.01)
*F16L 3/123* (2006.01)
*F16G 11/02* (2006.01)

(52) U.S. Cl.
CPC ......... *H01R 13/6392* (2013.01); *F16G 11/02* (2013.01); *F16L 3/1236* (2013.01)

(58) Field of Classification Search
CPC ........ F16L 3/1236; F16G 11/02; Y10T 24/39; Y10T 24/3916; Y10T 24/3993; H01R 13/6392
See application file for complete search history.

(56) References Cited

U.S. PATENT DOCUMENTS

| | | | | |
|---|---|---|---|---|
| 522,167 A * | 6/1894 | Rawlings | ............... | A01K 93/00 43/44.9 |
| 3,030,601 A * | 4/1962 | Krebs | ............... | H01R 13/6392 174/93 |
| 3,056,229 A * | 10/1962 | Haney | ............... | A01K 93/00 43/44.87 |
| 3,273,278 A * | 9/1966 | Lynch | ............... | A01K 93/00 43/44.87 |
| 3,363,216 A * | 1/1968 | Benedetto | ............ | H01R 13/6395 174/67 |
| 3,636,594 A * | 1/1972 | Faivre | .................... | B65D 63/14 119/769 |
| 3,772,718 A * | 11/1973 | Williams | ................ | B63B 21/20 174/135 |
| 4,361,978 A * | 12/1982 | Kane | ..................... | A01K 93/00 43/44.87 |
| 4,472,860 A | 9/1984 | Osterlind | | |
| 4,563,831 A * | 1/1986 | Gibney | ................. | A01K 93/00 43/44.87 |
| 4,693,031 A * | 9/1987 | Koetje | ................... | A01K 75/00 43/10 |
| 4,796,377 A * | 1/1989 | Hosegood | ............. | A01K 75/04 43/43.1 |
| 4,845,885 A | 7/1989 | Rubbelke | | |

(Continued)

*Primary Examiner* — Robert Sandy
*Assistant Examiner* — Rowland Do
(74) *Attorney, Agent, or Firm* — Margaret Millikin

(57) ABSTRACT

A device for holding an electrical cord, such as a cellular phone charging cord, so that the electrical cord is easily restrained, located and retrieved. The device may be constructed of a flexible body that may be in any desirable shape. The body is provided with a slit that extends some distance, and in some embodiments, approximately halfway through the body. An electrical cord can be inserted through the slit. At the center of the body, the slit is enlarged to form a channel for receiving the cord. With the cord thus secured within the channel, the body makes the cord easier to find and less likely to slip or fall off of a surface where the cord is to be placed.

16 Claims, 1 Drawing Sheet

(56) References Cited

U.S. PATENT DOCUMENTS

| | | | |
|---|---|---|---|
| 4,893,433 A * | 1/1990 | Scheffler | A01K 93/00 43/43.1 |
| 5,027,478 A * | 7/1991 | Suhr | B65H 75/36 137/355.16 |
| 5,397,088 A * | 3/1995 | White | B60J 3/023 248/309.1 |
| 5,584,720 A * | 12/1996 | Elswick | H01R 13/6392 439/368 |
| 5,713,753 A * | 2/1998 | Bayer | H01R 13/6392 439/369 |
| 5,782,649 A * | 7/1998 | Aiken | H01R 13/6392 439/367 |
| 5,784,828 A | 7/1998 | Thompson | |
| 5,901,930 A * | 5/1999 | Harrel | F16L 3/01 224/222 |
| 6,145,170 A * | 11/2000 | Bernard | B60R 7/005 24/116 A |
| D447,934 S * | 9/2001 | Manor, III | D8/367 |
| 6,431,500 B1 | 8/2002 | Jacobs et al. | |
| 6,503,115 B1 * | 1/2003 | Jermyn | B63B 22/00 405/171 |
| 6,602,102 B2 * | 8/2003 | Gines | C08J 9/32 2/15 |
| 6,698,560 B2 | 3/2004 | Reardon et al. | |
| 7,189,100 B1 * | 3/2007 | Colbourne | H01R 13/6392 439/367 |
| 7,475,510 B2 | 1/2009 | Franklin | |
| 7,607,618 B2 | 10/2009 | Mori et al. | |
| 8,139,809 B2 | 3/2012 | Jubelirer et al. | |
| D720,606 S * | 1/2015 | Mathews | D8/356 |
| 9,062,815 B2 * | 6/2015 | Kacines | F16M 11/12 |
| 9,357,284 B2 | 5/2016 | Bacino | |
| D775,938 S * | 1/2017 | Fleck | D8/367 |
| 9,653,837 B2 * | 5/2017 | Nooner | H01R 13/52 |
| D809,061 S * | 1/2018 | Wong | D19/203 |
| 2004/0097120 A1 * | 5/2004 | Limber | H01R 13/6392 439/369 |
| 2004/0216789 A1 * | 11/2004 | Benstead | E03C 1/04 137/801 |
| 2011/0267797 A1 * | 11/2011 | Clark | B60R 16/0215 361/825 |
| 2012/0098493 A1 * | 4/2012 | Budike | H02J 7/0044 320/111 |
| 2014/0076352 A1 * | 3/2014 | Baker | A45D 19/00 132/270 |
| 2015/0034776 A1 * | 2/2015 | St.John | F16L 3/223 248/68.1 |
| 2015/0089975 A1 * | 4/2015 | Paleschuck | G09F 23/00 63/1.13 |
| 2015/0097088 A1 * | 4/2015 | McMahon | F16L 3/1226 248/49 |
| 2015/0164190 A1 * | 6/2015 | Zaritsky | A44C 27/00 29/235 |

\* cited by examiner

CORD RESTRAINT FOR ELECTRICAL CORDS

CROSS-REFERENCE TO RELATED APPLICATIONS

This application claims priority to U.S. provisional application Ser. No. 62/421,421, entitled Cord Restraint for Electric Cords filed Nov. 14, 2016, the entirety of which is incorporated herein by reference.

TECHNICAL FIELD OF THE INVENTION

The present invention relates generally to devices for holding an electrical cord, such as a cellular phone charging cord, and more particularly, but not by way of limitation, to cord restraints for electrical cords so that the electrical cord is easily restrained, located and retrieved.

SUMMARY OF THE INVENTION

The present invention is directed to a cord restraint for an electrical cord having a diameter. The cord restraint comprises a flexible foam body having a diameter, wherein the flexible foam body forms a channel having a diameter that is substantially uniform in diameter and that is adapted for circumferentially receiving the electrical cord, the channel formed through the flexible foam body, and wherein the flexible foam body has a longest dimension and the channel is co-extensive with the longest dimension of the body; wherein the flexible foam body, circumferentially engages the electrical cord in the channel via surface friction; wherein the diameter of the flexible foam body is substantially greater than a diameter of the electrical cord.

The present invention further is directed to a cord restraint for an electrical cord having a diameter. The cord restraint comprises a flexible foam body having a diameter and forming a channel having a diameter that is substantially uniform in diameter and that is adapted for circumferentially receiving the electrical cord, wherein the flexible foam body has a longest dimension and the channel is co-extensive with the longest dimension of the flexible foam body and restrains the electrical cord therein without looping the electrical cord; wherein the diameter of the flexible foam body is substantially greater than a diameter of the electrical cord.

The present invention further is directed to a method of restraining an electrical cord. The method comprising the steps of providing a flexible body, wherein the flexible body forms a channel for circumferentially receiving the electrical cord, the channel formed through the body and wherein flexible body has a longest dimension and the channel is co-extensive with the longest dimension of the body, and circumferentially engaging the electrical cord in the channel via surface friction.

DETAILED DESCRIPTION OF THE INVENTION

Many people have a cellular phone charger near their nightstand or bed so that they can charge their cellular phone. One of the problems with such an arrangement is that the electrical cord of the phone charger is easily dislodged from the charging surface. Additionally, the electrical cord is small and can be hard to locate. To further complicate matters, the cord tends to fall or be dragged onto the floor behind the night stand, bed or between the night stand and the bed. In order to retrieve the cord, one must get on their hands and knees to search for the electrical cord or, in some circumstances, move furniture to retrieve the cord.

An additional problem occurs when using a cellular phone charger in a vehicle. The electrical cord tends to fall or be dragged onto the floor or between the seats. For safety reasons, the driver must bring the vehicle to a stop in order to search for the cord.

The present invention addresses these problems by providing a cord restraint for an electrical cord wherein the cord restraint mitigates the risk that the electrical cord will be dislodged from the charging surface and makes it easier to find the electrical cord when it is dislodged and lost. The present invention also can be used as a flotation device for cords for water-proof devices. As used herein, an electrical cord includes charging, communication, data distribution and power cords, cables, wires, lines, leads and filaments for electrical devices.

The cord restraint of the present invention comprises a body that may be constructed of a flexible foam material in the form of a ball, cube, or any other desirable shape. For the purpose of this invention, the body is provided with a slit that extends some distance into body and into which the cord can be inserted. Because the body is foam, it can be compressed or separated to allow the cord to be easily inserted into or removed from the slit within the body. At some distance into the body, for example, the center of the body, the slit is enlarged to form a channel for receiving the cord. With the cord thus secured within the channel, the body makes the cord easier to find and less likely to slip or fall off of a nightstand or other surface where the cord is to be placed. These and other advantages of the present invention will be apparent from the following description of embodiments.

Figure 1:
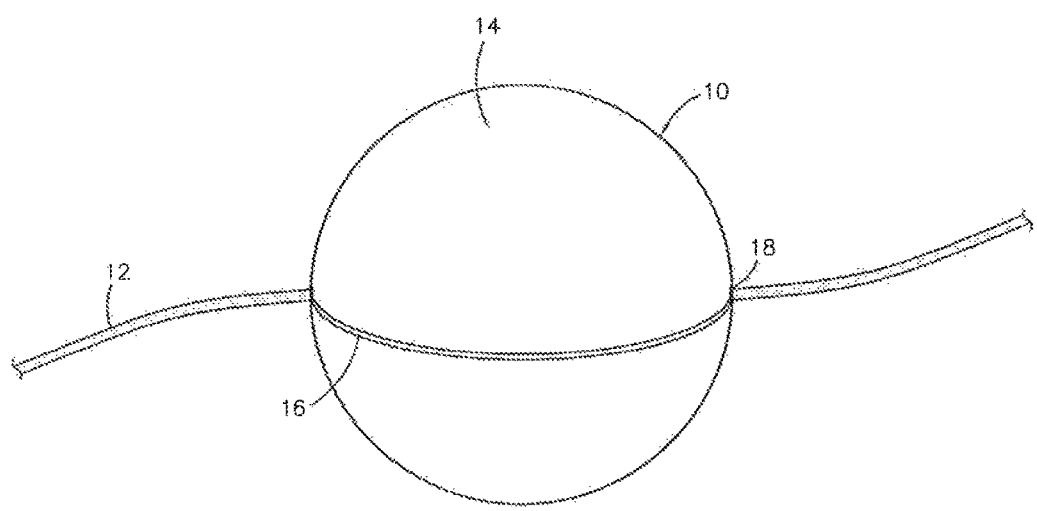
FIG. 1 is a front plan view of an exemplar of the cord restraint constructed in accordance with the present invention, depicting an electric cord secured within the channel running therethrough.

Turning now to the drawings in general, and to FIG. 1 in particular, there is shown therein an exemplar of a cord restraint 10 constructed in accordance with the present invention. The cord restraint 10 of FIG. 1 is shown with an electric cord 12 secured therein. The cord restraint 10 comprises a body 14 that may be in the form of a ball, cube, sphere, torus, polyhedron, sporting equipment, body parts or any other desirable shape. For purposes of illustration only, FIG. 1 depicts a ball shaped structure or spherical body 14.

The body 14 preferably is flexible. To that end, the body 14 may be comprised of any solid foam material that is conformable and deformable to receive an object, yet which engages the surface of the electrical cord 12 when inserted into the body. Some solid foams that are useful in the present invention for constructing the body 14 include ethylene-vinyl acetate (EVA) foam, polyethylene-vinyl acetate (PEVA), low-density polyethylene (LDPE) foam, first grade of polyethylene (PE), nitrile rubber (NBR) foam, the copolymers of acrylonitrile (ACN) and butadiene, polychloroprene foam or neoprene, polyimide foam, polypropylene (PP) foam, including expanded polypropylene (EPP) and polypropylene paper (PPP), polystyrene (PS) foam, including expanded polystyrene (EPS), extruded polystyrene foam (XPS) and sometimes polystyrene paper (PSP), styrofoam, including extruded polystyrene foam (XPS) and sometimes expanded polystyrene (EPS), polyurethane (PU) foam, viscoelastic polyurethane foam, or low-resilience polyurethane foam (LRPu), memory foam, sorbothane, polyvinyl chloride (PVC) foam, closed-cell PVC foamboard, silicone foam and microcellular foam, and combinations of the foregoing. In one embodiment of the invention, the body 14 is comprised of polyurethane foam (PU), which is a type of memory foam commonly used as stress reducers that can be squeezed to reduce stress or tension. For purposes yet to be described, one advantage of polyurethane foam is that it is flexible and soft and deforms easily in response to warmth and pressure. However, it will be appreciated that any foam material capable of receiving the electrical cord 14 may be used to construct the body 14. Certain foam materials provide greater surface friction and gripping engagement with the electrical cord 12, thus enabling the body 14 to be smaller in size and still permit the electrical cord to be easily restrained, located and retrieved.

Figure 2:
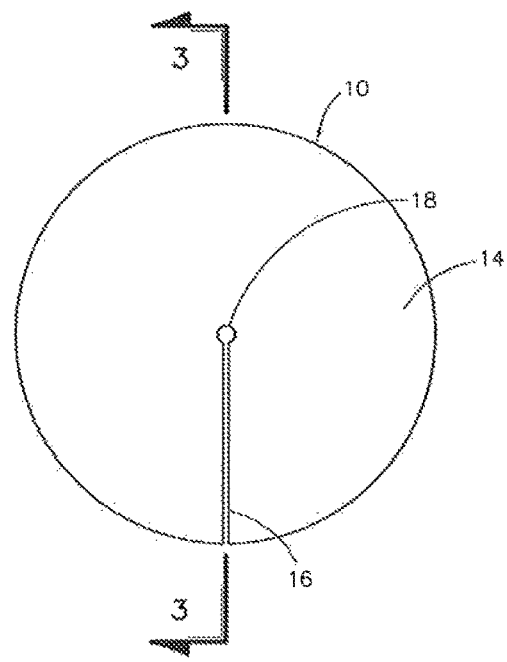
FIG. 2 is side view of an exemplar of the cord restraint constructed in accordance with the present invention.
Figure 3:
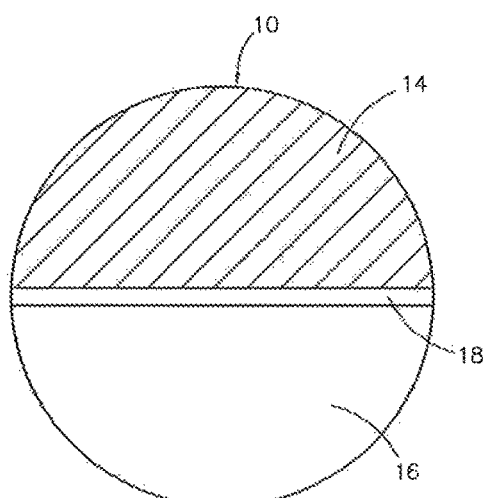
FIG. 3 is a cross sectional view of the cord restraint of FIG. 2 taken along line 3-3.

Turning now to FIGS. 2 and 3, the body 14 is provided with a slit 16 for permitting ingress and egress of the electrical cord 12. The electrical cord 12 may be inserted into the channel 18 through the slit 16. The slit 16 extends continuously some distance into the body 14 and communicates with and terminates in a channel 18 in a manner yet to be described. The body 14 may be squeezed or deformed to allow the electrical cord 12 to be easily inserted into or removed through the slit 16 within the body 14.

Turning to FIG. 3, but with continuing reference to FIGS. 1 and 2, it will be appreciated that the slit 16 terminates in and communicates with a channel 18 formed in the body 14 at a sufficient distance into the body 14. The channel 18 holds and securely engages the electrical cord 12. In one embodiment of the invention, the slit 16 extends approximately halfway through the body 14 or to the center of the body. The distance that the slit 16 extends into the body 14 before terminating in channel 18 depends upon location of the channel, the size and shape of the body, the weight and thickness of the electrical cord 12 and the type of foam used to construct the body. Heavier and/or thicker electrical cords 12 will require stronger engagement with the body 14 which may be imparted by selecting a foam that easily restrains and grips the cord, and thus permits the cord restraint 10 to be more easily located and retrieved without the electrical cord 12 extending as far into the body. It will be appreciated, however, that the electrical cord 12 generally will be more securely held in place in the cord restraint 10 when the electrical cord is received more deeply into the body 14.

The channel 18 is formed a sufficient distance into the body 14 and runs therethrough. In one embodiment of the invention, the channel 18 may be situated approximately halfway through the body 14 or at the center of the body. The distance that channel 18 extends into the body depends upon the size and shape of the body, the weight and thickness of the electrical cord 12 and the type of foam used to construct the body. Heavier and/or thicker electrical cords 12 will require stronger engagement with the body 14 which may be imparted by selecting a foam that easily restrains and grips the cord, and thus permits the cord restraint 10 to be more easily located and retrieved without the channel 18 extending as far into the body. It will be appreciated, however, that the electrical cord 12 generally will be more securely held in place in the cord restraint 10 when the channel 18 is situated more deeply in the body 14 and the electrical cord, accordingly, is received more deeply into the body 14.

The channel 18 may run through the body 14 vertically, horizontally, diagonally, or in any other configuration. The orientation of the channel 18 within the body 14 depends upon the shape and size of the body and also upon the type of foam used to construct the body and the thickness and weight of the electrical cord 12. The cord restraint 10 will have dimensions which are a function of the size and shape of the body.

In one embodiment of the invention, the channel 18 is co-extensive with the longest dimension of the body 14. As shown in FIG. 3, wherein the body 14 is depicted as a sphere, the longest dimension of the body is the diameter of the sphere. Accordingly, to optimize gripping engagement of the body 14 with the electrical cord 12, the channel 18 is contiguous with the diameter of the sphere. It will be appreciated that the location of the channel 18 within the body 14 will vary with the size and shape of the body, and other factors.

The electrical cord 12 is fully received within the channel 18 formed within the body 14 so that the body circumferentially engages the electrical cord. The foam material from which the body is made further secures the electrical cord within the body by creating friction therewith. With the electrical cord 12 thus secured within the channel 18, the body 14 makes the cord 12 easier to find and less likely to slip or fall off of a nightstand or other surface where the electrical cord is placed.

While the invention has been described for use in association with a cord for a cellular phone charger, the invention is not so limited and may be used in association with a variety of different types of cords and electrical devices. While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A cord restraint for an electrical cord having a diameter, the cord restraint comprising:
    a flexible foam body having a diameter, wherein the flexible foam body forms a channel having a diameter that is substantially uniform in diameter and that is adapted for circumferentially receiving the electrical cord, the channel formed through the flexible foam body; and
    wherein the flexible foam body has a longest dimension and the channel is co-extensive with the longest dimension of the flexible foam body;
    wherein the flexible foam body circumferentially engages the electrical cord in the channel via surface friction; and
    wherein the diameter of the flexible foam body is substantially greater than a diameter of the electrical cord.

2. The cord restraint of claim 1 further comprising a slit terminating in and communicating with the channel, wherein the channel is ingressed and egressed through the slit in the flexible foam body.

3. The cord restraint of claim 1 wherein the channel is formed through the center of the flexible foam body.

4. The cord restraint of claim 1 wherein the flexible foam body is constructed of a material selected from the group consisting of ethylene-vinyl acetate (EVA) foam, polyethylene-vinyl acetate (PEVA), low-density polyethylene (LUPE) foam, first grade of polyethylene (PE), nitrile rubber (NBR) foam, the copolymers of acrylonitrile (ACN) and butadiene, polychloroprene foam or neoprene, polyimide foam, polypropylene (PP) foam, including expanded polypropylene (EPP) and polypropylene paper (PPP), polystyrene (PS) foam, including expanded polystyrene (EPS), extruded polystyrene foam (XPS) and sometimes polystyrene paper (PSP), styrofoam, including extruded polystyrene foam (XPS) and sometimes expanded polystyrene (EPS), polyurethane (PU) foam, viscoelastic polyurethane foam, or low-resilience polyurethane foam (LRPu), memory foam, sorbothane, polyvinyl chloride (PVC) foam, closed-cell PVC foamboard, microcellular foam, and combinations of the foregoing.

5. The cord restraint of claim 4 wherein the flexible foam body is constructed from polyurethane foam (PLO.

6. The cord restraint of claim 1 wherein the flexible foam body is spherical.

7. The cord restraint of claim 1 wherein the electrical cord is a charging cord for an electrical device.

8. The cord restraint of claim 7 wherein the electrical cord is used with a cell phone.

9. The cord restraint of claim 1 wherein the cord restraint is a flotation device for cords for waterproof devices.

10. A cord restraint for an electrical cord having a diameter, the cord restraint comprising:
a flexible foam body having a diameter and forming a channel having a diameter that is substantially uniform in diameter and that is adapted for circumferentially receiving the electrical cord;
wherein the flexible foam body has a longest dimension and the channel is co-extensive with the longest dimension of the flexible foam body and restrains the electrical cord therein without looping the electrical cord; and
wherein the diameter of the flexible foam body is substantially greater than a diameter of the electrical cord.

11. The cord restraint of claim 10 further comprising a slit terminating in and communicating with the channel, wherein the channel is ingressed and egressed through the slit in the flexible foam body.

12. The cord restraint of claim 10 wherein the flexible foam body is constructed of a material selected from the group consisting of ethylene-vinyl acetate (EVA) foam, polyethylene-vinyl acetate (PEVA), low-density polyethylene (LDPE) foam, first grade of polyethylene (PE), nitrile rubber (NBR) foam, the copolymers of acrylonitrile (ACN) and butadiene, polychloroprene foam or neoprene, polyimide foam, polypropylene (PP) foam, including expanded polypropylene (EPP) and polypropylene paper (PPP), polystyrene (PS) foam, including expanded polystyrene (EPS), extruded polystyrene foam (XPS) and sometimes polystyrene paper (PSP), styrofoam, including extruded polystyrene foam (XPS) and sometimes expanded polystyrene (EPS), polyurethane (PU) foam, viscoelastic polyurethane foam, or low-resilience polyurethane foam (LRPu), memory foam, sorbothane, polyvinyl chloride (PVC) foam, closed-cell PVC foamboard, microcellular foam, and combinations of the foregoing.

13. The cord restraint of claim 10 wherein the electrical cord is a charging cord for an electrical device.

14. The cord restraint of claim 10 wherein the electrical cord is used with a cell phone.

15. The cord restraint of claim 10 wherein the cord restraint is a flotation device for cords for waterproof devices.

16. The cord restraint of claim 10 wherein the body is spherical.

* * * * *